(12) United States Patent
Khoshnevisan et al.

(10) Patent No.: US 11,497,018 B2
(45) Date of Patent: Nov. 8, 2022

(54) HARQ PROCESS IDENTIFIER DETERMINATION FOR MULTIPLE CONFIGURED SCHEDULING PROCESSES

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US); Tao Luo, San Diego, CA (US); Arumugam Chendamarai Kannan, San Diego, CA (US); Vinay Chande, San Diego, CA (US); Makesh Pravin John Wilson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 215 days.

(21) Appl. No.: 16/722,851

(22) Filed: Dec. 20, 2019

(65) Prior Publication Data
US 2020/0229182 A1    Jul. 16, 2020

Related U.S. Application Data

(60) Provisional application No. 62/791,234, filed on Jan. 11, 2019.

(51) Int. Cl.
*H04W 72/04* (2009.01)
*H04L 1/18* (2006.01)

(52) U.S. Cl.
CPC ....... *H04W 72/0446* (2013.01); *H04L 1/1854* (2013.01); *H04L 1/1887* (2013.01)

(58) Field of Classification Search
CPC ............. H04W 72/0446; H04L 1/1854; H04L 1/1887; H04L 1/1822
See application file for complete search history.

(56) References Cited

U.S. PATENT DOCUMENTS

| | | | |
|---|---|---|---|
| 2016/0366704 A1* | 12/2016 | Lee | H04W 72/0413 |
| 2018/0249513 A1* | 8/2018 | Chang | H04L 9/40 |
| 2019/0357178 A1* | 11/2019 | Bae | H04L 5/10 |

FOREIGN PATENT DOCUMENTS

EP    3637903 A1 *    4/2020    ............... H04L 1/18

OTHER PUBLICATIONS

AT&T: "Remaining Details on Supporting Multi-TRP Transmission and Reception", 3GPP Draft, R1-1716165, Remaining Details on Supporting Multi-TRP Transmission and Reception, 3rd Generation Partnership Project (3GPP), Mobile Competence Centre, 650, Route Des Lucioles, F-06921 SOP vol. RAN WG1, No. Nagoya, Japan, Sep. 18, 2017-Sep. 21, 2017, Sep. 17, 2017 (Sep. 17, 2017), XP051339623, 4 Pages, Retrieved from the Internet: URL: http://www.3gpp.org/ftp/Meetings_3GPP_SYNC/RAN1/Docs/. [retrieved on Sep. 17, 2017] paragraph [0004].

(Continued)

*Primary Examiner* — Chi H Pham
*Assistant Examiner* — Raul Rivas
(74) *Attorney, Agent, or Firm* — Harrity & Harrity, LLP

(57) ABSTRACT

Various aspects of the present disclosure generally relate to wireless communication. In some aspects, a user equipment (UE) may determine a first hybrid automatic repeat request (HARQ) process identifier set associated with a first configured scheduling process and may determine a second HARQ process identifier set associated with a second configured scheduling process. The UE may assign an HARQ process identifier, included in the first HARQ process identifier set, to a process instance associated with the first configured scheduling process and may assign an HARQ process identifier, included in the second HARQ process identifier set, to a process instance associated with the second configured scheduling process. Numerous other aspects are provided.

30 Claims, 13 Drawing Sheets

(56) References Cited

OTHER PUBLICATIONS

Huawei: "Summary of [99bis#41] [NRUP/MAC] Open issues on SPS and GF—Huawei," 3GPP Draft; R2-1713173 Summary of [99BIS#41]NR_UP_MAC Email Discussion for SPS and GF, 3rd Generation Partnership Project (3GPP), Mobile Competence Centre; 650, Route Des Lucioles; F-06921 Sophia-AN, vol. RAN WG2, No. Reno, United States; Nov. 27, 2017-Dec. 1, 2017, Nov. 17, 2017, XP051371975, 58 Pages.

Huawei, et al., "DL Multi-TRP/Panel Operation in R15", 3GPP Draft, R1-1802073, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 26, 2018-Mar. 2, 2018, Feb. 16, 2018 (Feb. 16, 2018), XP051397457, 3 pages, Retrieved from the Internet: URL: http://www.3gpp.org/ftp/tsg%5Fran/WG1%5FRL1/TSGR1%5F92/Docs/. [retrieved on Feb. 16, 2018] paragraph [02. 3].

Huawei, et al., "UL Data Transmission With and Without SR/UL Grant", 3GPP TSG WG1 NR Ad Hoc Meeting, 3GPP Draft, R1-1715419, 3RD Generation Partnership Project (3GPP), Mobile Competence Centre, 650, Route Des Lucioles, F-06921 Sophia-Antipolis Cedex, France, No. Nagoya, Japan, Sep. 18, 2017-Sep. 21, 2017, Sep. 17, 2017 (Sep. 17, 2017), XP051338887, 11 Pages, Retrieved from the Internet: URL: http://www.3gpp.org/ftp/Meetings_3GPP_SYNC/RAN1/Docs/ [retrieved on Sep. 17, 2017]. p. 1, Line 1-p. 2, Line 21.

International Search Report and Written Opinion—PCT/US2019/068321—ISA/EPO—dated Mar. 20, 2020.

Nokia, et al., "On SPS Operation for Shorter TTI", 3GPP Draft, R1-1719950, 3rd Generation Partnership Project (3GPP), Mobile Competence Centre, 650, Route Des Lucioles, F-06921, Sophia-Antipolis Cedex, France, vol. RAN WG1, No. Reno, Nevada (USA), Nov. 27, 2017-Dec. 1, 2017, Nov. 17, 2017 (Nov. 17, 2017), XP051368884, 6 pages, Retrieved from the Internet: URL: http://www.3gpp.org/ftp/tsg%5Fran/WG1%5FRL1/TSGR1%5F91/Docs/. [retrieved on Nov. 17, 2017] paragraph [03.3].

* cited by examiner

HARQ PROCESS IDENTIFIER DETERMINATION FOR MULTIPLE CONFIGURED SCHEDULING PROCESSES

CROSS-REFERENCE TO RELATED APPLICATION

This application claims priority to U.S. Provisional Patent Application No. 62/791,234, filed on Jan. 11, 2019, entitled "HARQ PROCESS IDENTIFIER DETERMINATION FOR MULTIPLE CONFIGURED SCHEDULING PROCESSES," which is hereby expressly incorporated by reference herein.

TECHNICAL FIELD

Aspects of the technology described below generally relate to wireless communication, and to techniques and apparatuses for hybrid automatic repeat request (HARQ) process identifier determination for multiple configured scheduling processes. Some techniques and apparatuses described herein enable and provide wireless communication devices and systems configured for enabling multiple configured scheduling processes in multi-transmit receive point (multi-TRP) configurations.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). As demand for mobile broadband access continues to increase, there exists a need for further improvements in LTE and NR technologies. These improvements can apply to other multiple access technologies and the telecommunication standards that employ these technologies.

BRIEF SUMMARY OF SOME EXAMPLES

In some aspects, a method of wireless communication, performed by a user equipment (UE), may include determining a first hybrid automatic repeat request (HARQ) process identifier set associated with a first configured scheduling process. The method may include determining a second HARQ process identifier set associated with a second configured scheduling process. The method may include assigning an HARQ process identifier, included in the first HARQ process identifier set, to a process instance associated with the first configured scheduling process. The method may include assigning an HARQ process identifier, included in the second HARQ process identifier set, to a process instance associated with the second configured scheduling process.

In some aspects, a UE for wireless communication may include memory and one or more processors operatively coupled to the memory. The memory and the one or more processors may be configured to determine a first HARQ process identifier set associated with a first configured scheduling process. The memory and the one or more processors may be configured to determine a second HARQ process identifier set associated with a second configured scheduling process. The memory and the one or more processors may be configured to assign an HARQ process identifier, included in the first HARQ process identifier set, to a process instance associated with the first configured scheduling process. The memory and the one or more processors may be configured to assign an HARQ process identifier, included in the second HARQ process identifier set, to a process instance associated with the second configured scheduling process.

In some aspects, a non-transitory computer-readable medium may store one or more instructions for wireless communication. The one or more instructions, when executed by one or more processors of a UE, may cause the one or more processors to determining a HARQ process identifier set associated with a first configured scheduling process. The one or more instructions, when executed by one or more processors of a UE, may cause the one or more processors to determine a second HARQ process identifier set associated with a second configured scheduling process. The one or more instructions, when executed by one or more processors of a UE, may cause the one or more processors to assign an HARQ process identifier, included in the first HARQ process identifier set, to a process instance associated with the first configured scheduling process. The one or more instructions, when executed by one or more processors of a UE, may cause the one or more processors to assign an HARQ process identifier, included in the second HARQ process identifier set, to a process instance associated with the second configured scheduling process.

In some aspects, an apparatus for wireless communication may include means for determining a first HARQ process identifier set associated with a first configured scheduling process. The apparatus may include means for determining a second HARQ process identifier set associated with a second configured scheduling process. The apparatus may include means for assigning an HARQ process identifier, included in the first HARQ process identifier set, to a process instance associated with the first configured scheduling process. The apparatus may include means for assigning an HARQ process identifier, included in the second HARQ process identifier set, to a process instance associated with the second configured scheduling process.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description is provided herein, with some aspects of the disclosure being illustrated in the appended drawings. However, the appended drawings illustrate only some aspects of this disclosure and are therefore not to be considered limiting of the scope of the disclosure. The same reference numbers in different drawings may identify the same or similar elements.

DETAILED DESCRIPTION

Figure 1:
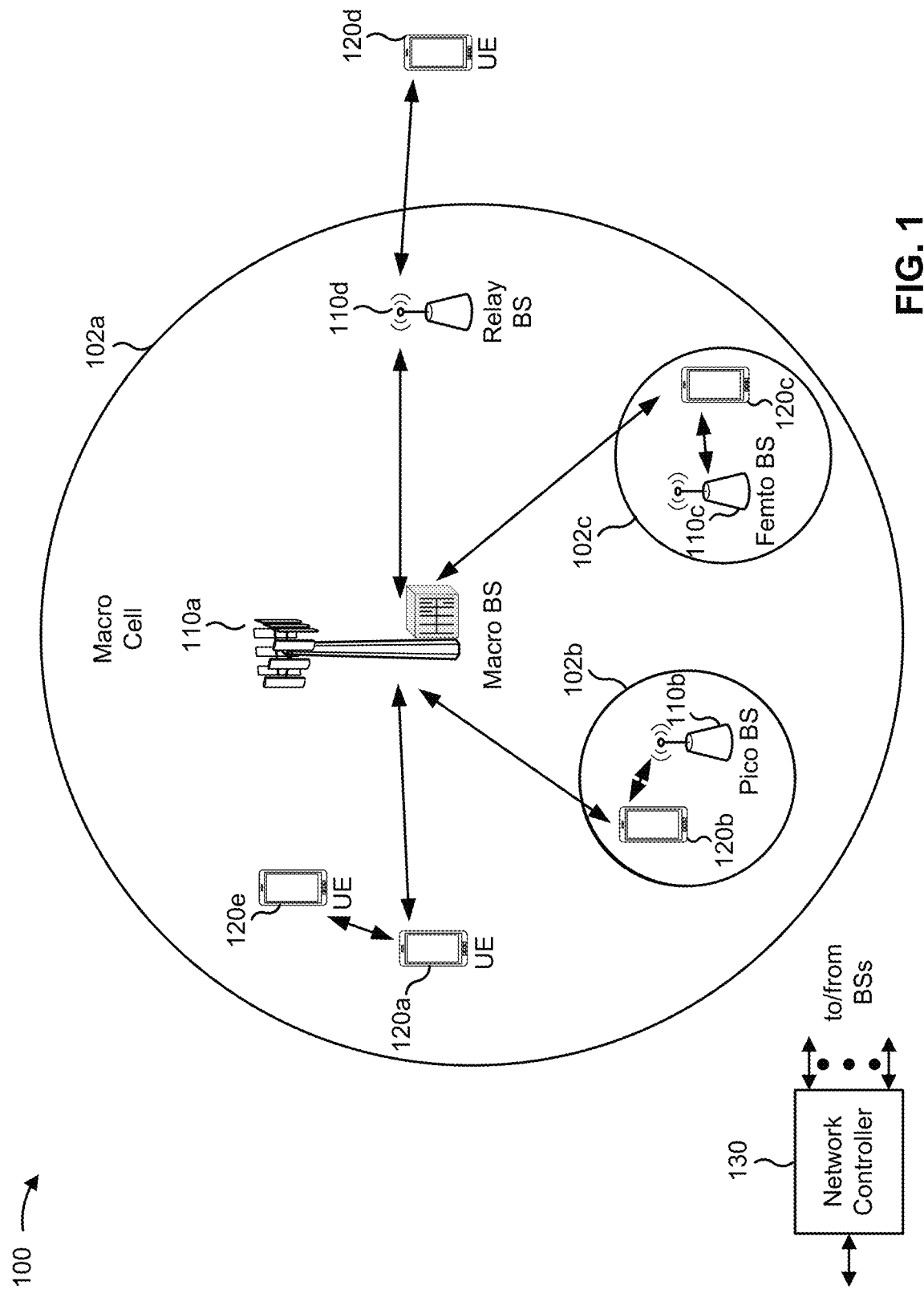
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements" or "features"). These elements may be implemented using hardware, software, or combinations thereof. Whether such elements are implemented as hardware or software depends upon the particular application and design constraints imposed on the overall system.

While some aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, RF-chains, power amplifiers, modulators, buffers, processors, interleavers, adders/summers, and/or the like). It is intended that innovations described herein may be practiced in a wide variety of devices, chip-level components, systems, distributed arrangements, end-user devices, etc. of varying sizes, shapes, and constitution.

FIG. 1 is a diagram illustrating a wireless network 100 in which aspects of the present disclosure may be practiced. The wireless network 100 may be an LTE network or some other wireless network, such as a 5G or NR network. Wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, robotics, drones, implantable devices, augmented reality devices, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D)

communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
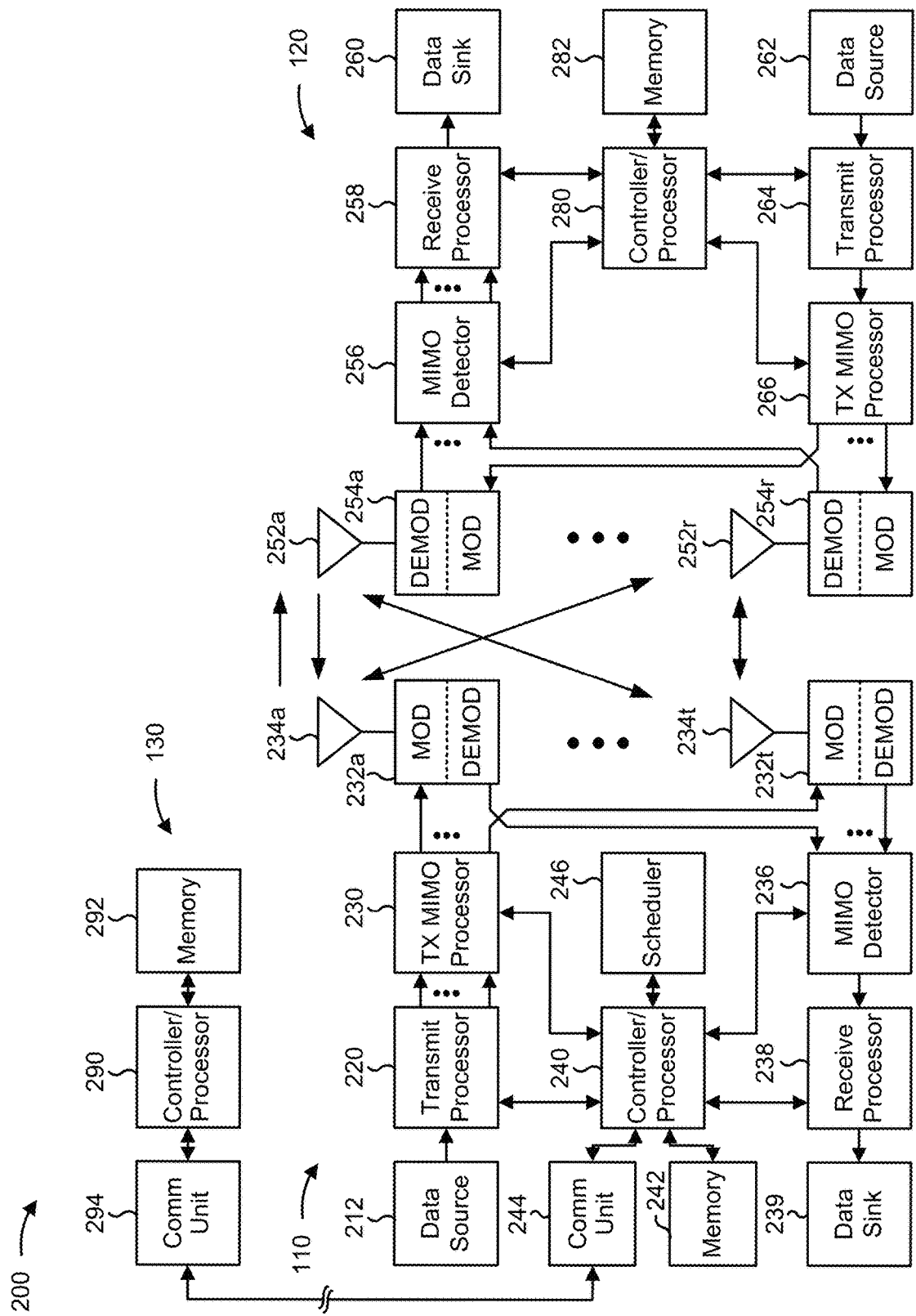
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 can carry out a number of functions associated with communications. For example, transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with HARQ process identifier determination for multiple configured scheduling processes, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining a first hybrid automatic repeat request (HARQ) process identifier set associated with a first configured scheduling process, means for determining a second HARQ process identifier set associated with a second configured scheduling process, means for assigning an HARQ process identifier, included in the first HARQ process identifier set, to a process instance associated with the first configured scheduling process, means for assigning an HARQ process identifier, included in the second HARQ process identifier set, to a process instance associated with the second configured scheduling process, and/or the like. In some aspects, such means may include one or more components of UE 120 described in connection with FIG. 2, such as antenna 252, DEMOD 254, MOD 254, MIMO detector 256, receive processor 258, transmit processor 264, TX MIMO processor 266, controller/processor 280, and/or the like.

As indicated above, FIG. 2 is provided merely as an example. Other examples may differ from what is described with regard to FIG. 2.

Figure 3A:
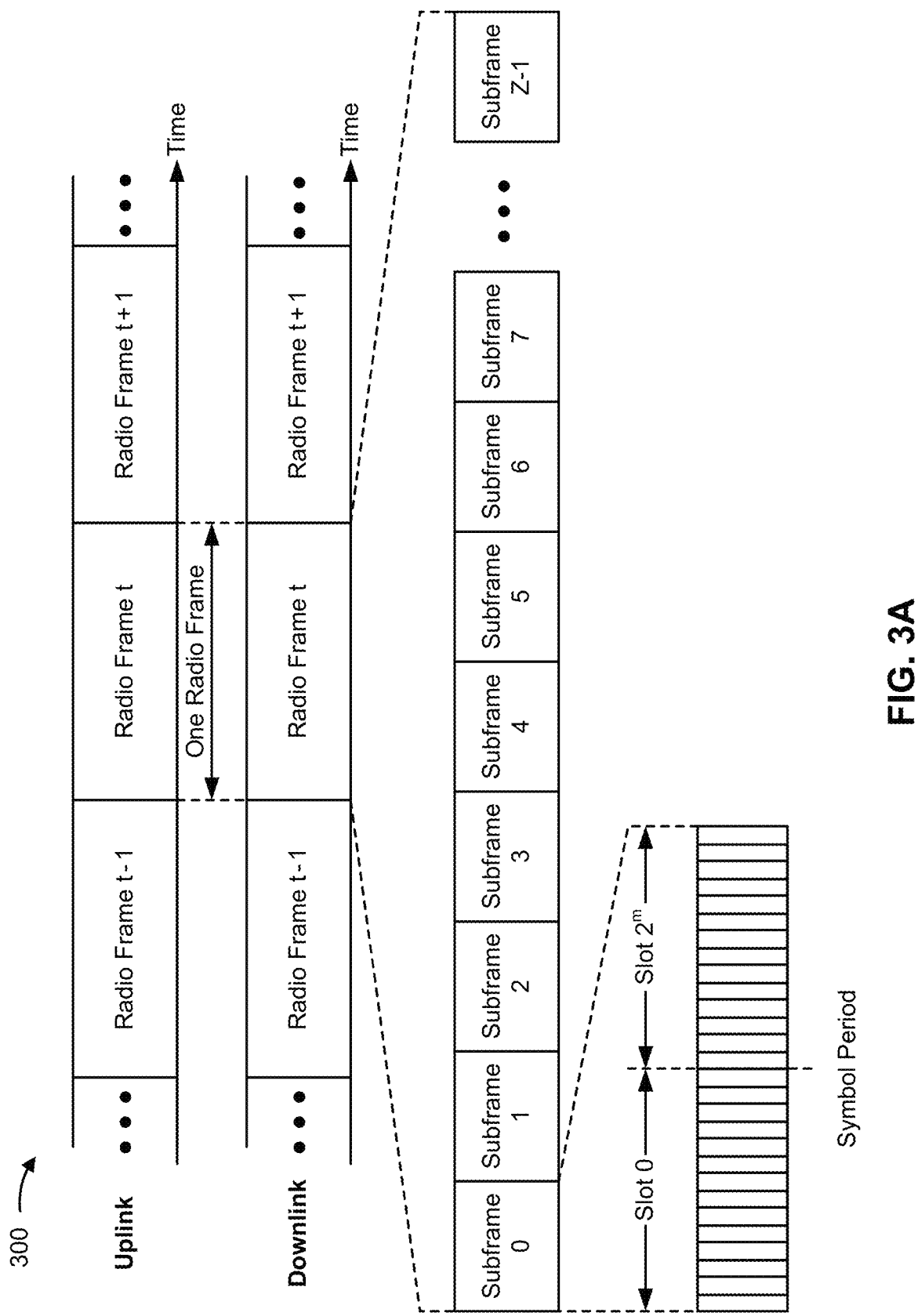
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
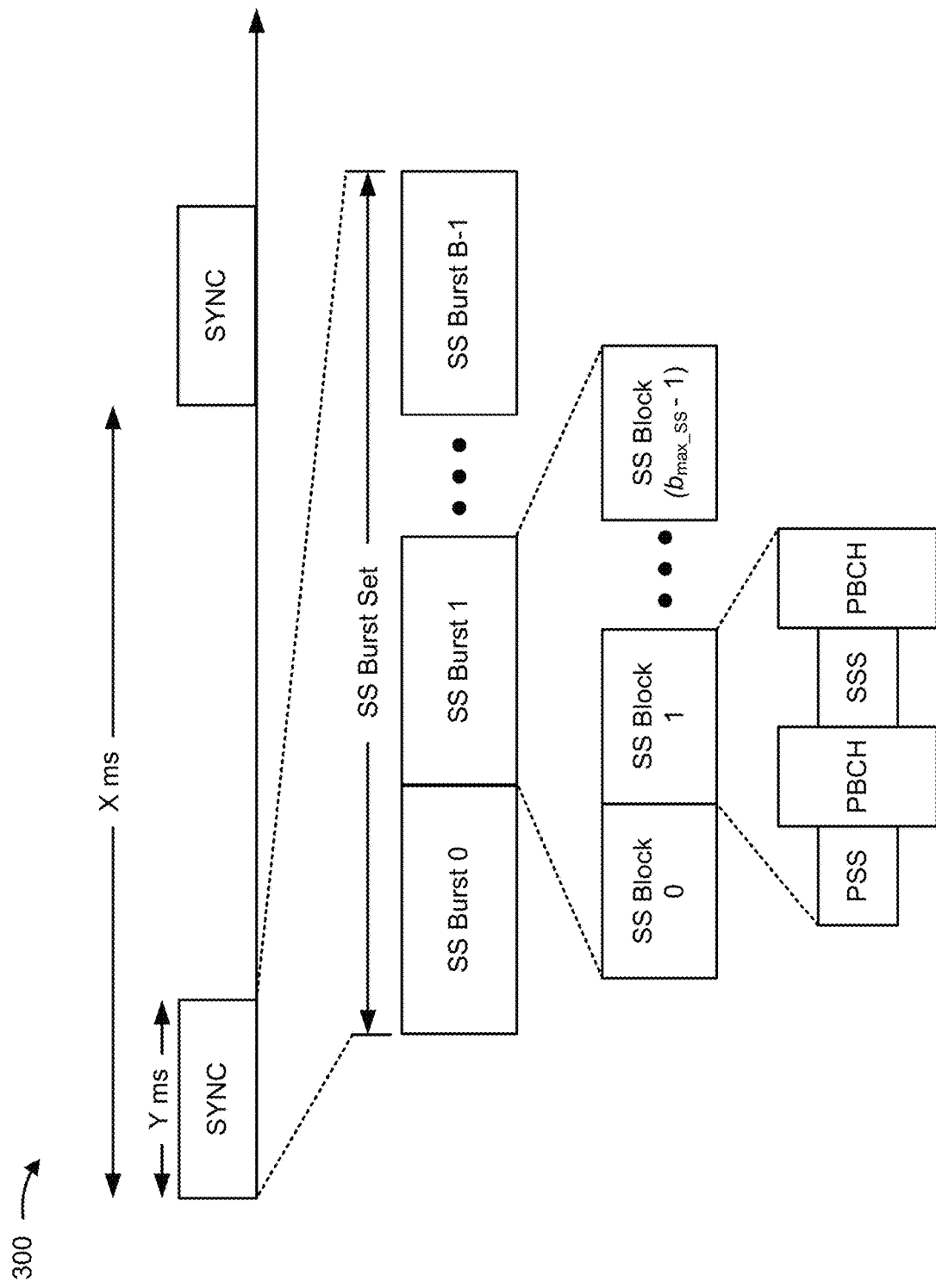
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
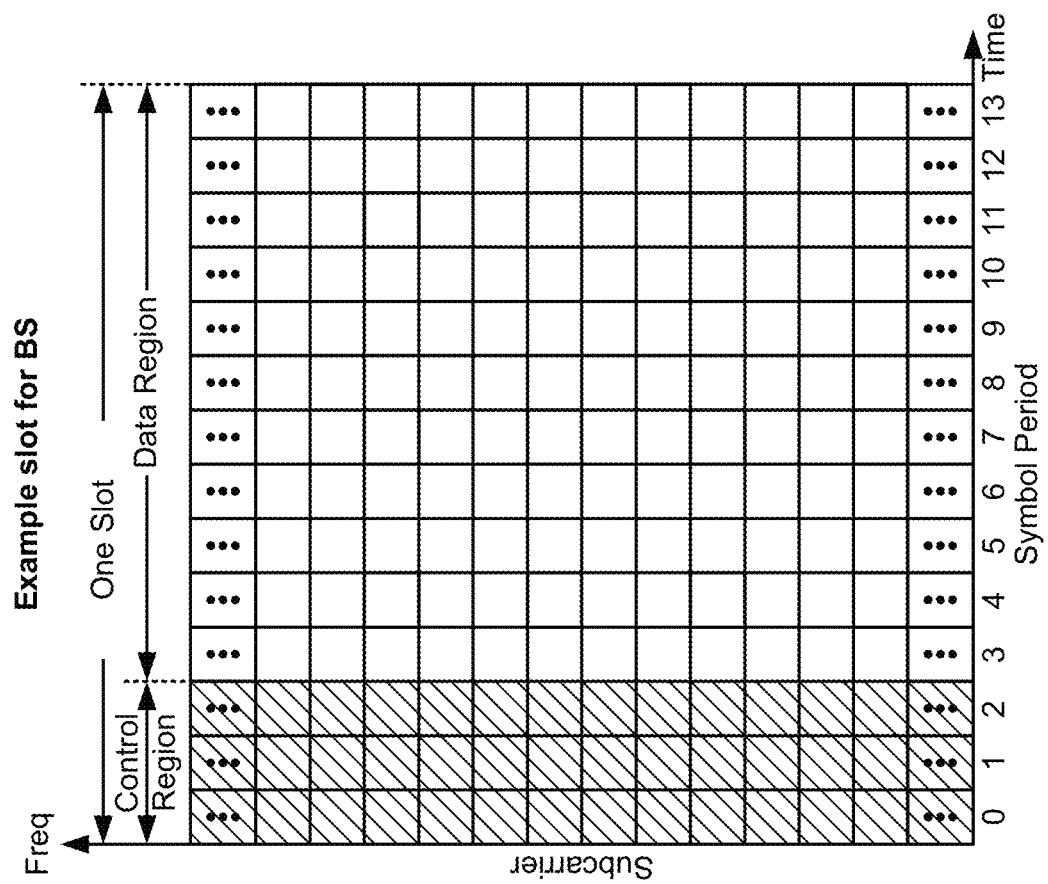
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
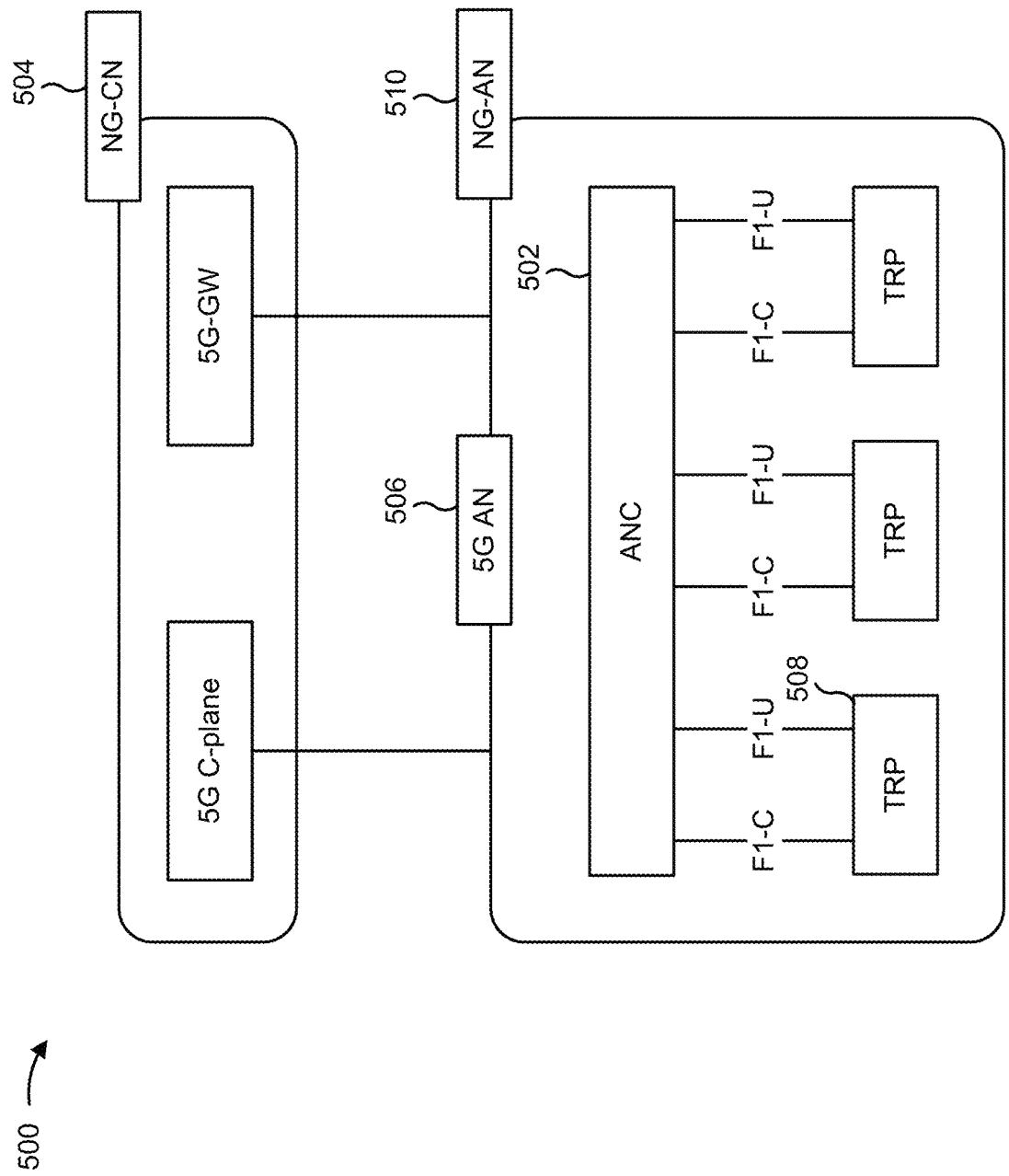
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
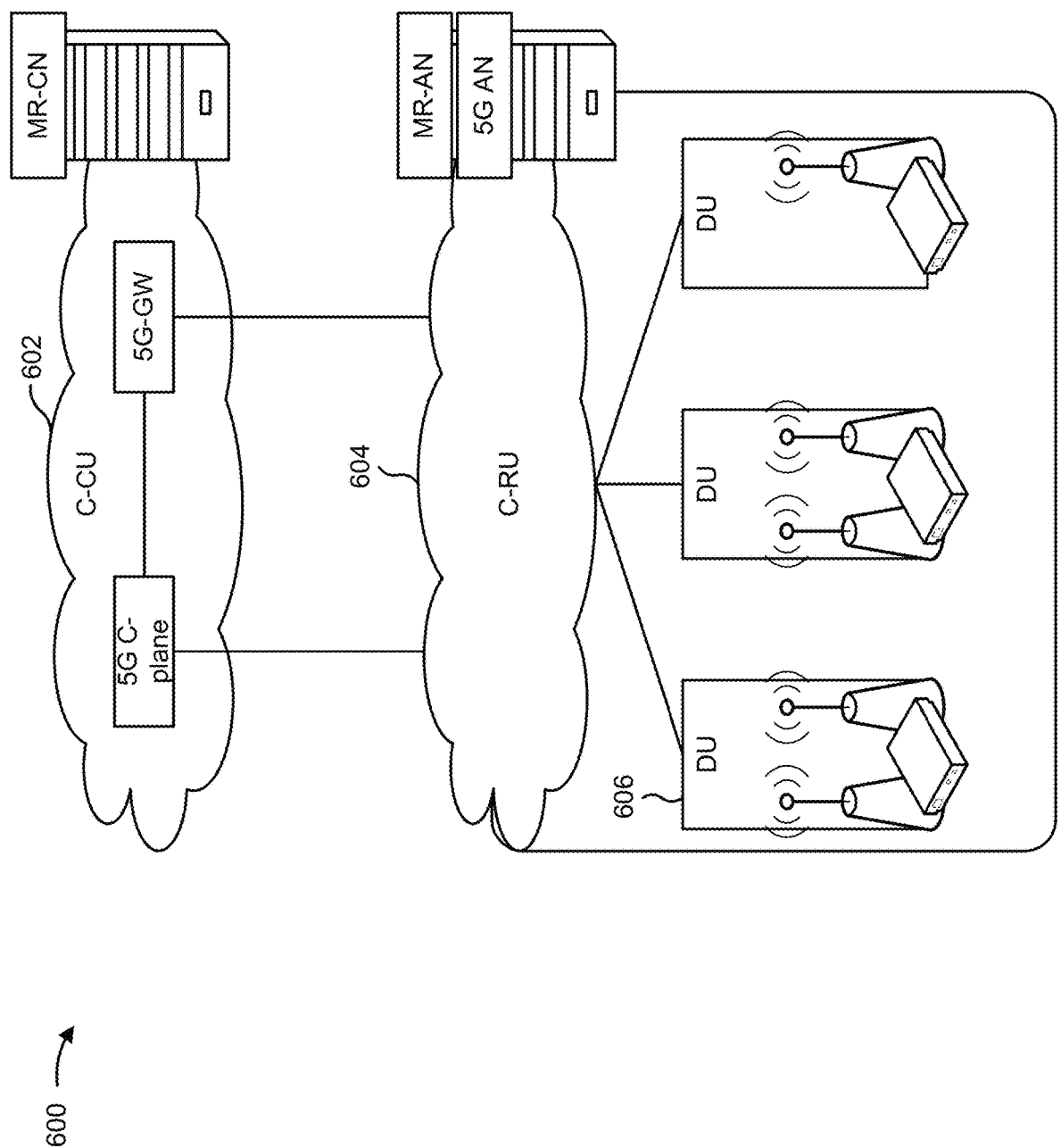
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

In a wireless network, various scheduling processes may be configured for downlink communication and/or uplink communication. For example, a semi-persistent scheduling (SPS) process may be configured for downlink communication between a transmit receive point (TRP) and a user equipment (UE). As another example, a grant-free scheduling (GFS) process or uplink configured grant process may be configured for uplink communication between the TRP and the UE.

In some cases, the TRP and UE may implement a plurality of hybrid automatic repeat request (HARQ) processes, associated with a configured scheduling process, for forward error correction for downlink communication and/or uplink communication. An HARQ process may store, in a buffer memory, a received original communication and any received retransmissions of the communication that are associated with a particular process instance (which may include a semi-persistent scheduling transmission in the case of downlink communication or may include a grant-free transmission or an uplink configured grant transmission in the case of uplink communication) of the configured scheduling process. In this way, the original communication and the received retransmission(s) may be combined (which may be referred to as soft combining) to correct any errors that may have occurred in the original communication.

In some cases, the HARQ process identifiers that are associated with the plurality of HARQ processes may not be transmitted to the UE when the configured scheduling process is initiated. Instead, the UE may determine the HARQ process identifiers based at least in part on an equation. For example, for a semi-persistent scheduling type of configured scheduling process, the UE may determine the HARQ process identifiers based at least in part on Equation 1:

$$HARQ\ Process\ ID = [floor\ (CURRENT\_slot \times 10 / (numberOfSlotsPerFrame \times SPS\ periodicity))]\ modulo\ nrofHARQ\_Processes \qquad \text{Equation 1}$$

where nrofHARQ_Processes corresponds to the quantity of HARQ processes associated with the SPS. CURRENT_slot may be determined according to Equation 2:

$$CURRENT\_slot = [(SFN \times numberOfSlotsPerFrame) + slot\ number\ in\ the\ frame] \qquad \text{Equation 2}$$

where SFN corresponds to the subframe number of CURRENT_slot.

As another example, for a grant-free scheduling (GFS) type or an uplink configured grant type of configured scheduling process, the UE may determine the HARQ process identifiers based at least in part on Equation 3:

$$HARQ\ Process\ ID = [floor(CURRENT\_symbol/GFS\ periodicity)]\ modulo\ nrofHARQ\_Processes \qquad \text{Equation 3}$$

where nrofHARQ_Processes corresponds to the quantity of HARQ processes associated with the GFS. CURRENT_slot may be determined according to Equation 4:

$$CURRENT\_symbol = (SFN \times numberOfSlotsPerFrame \times numberOfSymbolsPerSlot + slot\ number\ in\ the\ frame \times numberOfSymbolsPerSlot + symbol\ number\ in\ the\ slot) \qquad \text{Equation 4}$$

where SFN corresponds to the subframe number of CURRENT_slot.

While the UE may be capable of determining the HARQ process identifiers in a single-TRP configuration (e.g., where the UE communicates with a single TRP), the UE may be unable to determine respective HARQ process identifier sets for a plurality of TRPs in a multi-TRP configuration or for a plurality of antenna panels in a multi-panel configuration. As a result, the UE may be unable to determine which HARQ processes are assigned to a particular TRP in the multi-TRP configuration or assigned to a particular antenna panel in the multi-panel configuration, which in turn may result in the UE being unable to perform forward error correction for downlink communication and/or uplink communication with the TRP or antenna panel. Even in some single-TRP configurations, such as where the UE is configured with more than one semi-persistent scheduling grant and/or more than one uplink configured grant, the UE may be unable to determine which HARQ process belongs to which grant configuration.

Some aspects, described herein, provide techniques and apparatuses for HARQ process identifier determination for multiple configured scheduling processes. In some aspects, a UE may determine respective HARQ process identifier sets for a plurality of configured scheduling processes. In some aspects, the UE may receive, from a TRP, information associated with a first HARQ process identifier set and information associated with a second HARQ process identifier set. The UE may determine the first HARQ process identifier set based at least in part on the information associated with the first HARQ process identifier set, and may determine the second HARQ process identifier set based at least in part on the information associated with the second HARQ process identifier set. The UE may assign HARQ process identifiers, included in the first HARQ process identifier set, to process instances associated with the first configured scheduling process. Moreover, the UE may assign HARQ process identifiers, included in the second HARQ process identifier set, to process instances associated with the second configured scheduling process.

In this way, the UE and a plurality of TRPs may be permitted to determine respective HARQ process identifier sets for a multi-TRP configuration and/or a multi-panel configuration and/or may be permitted to assign HARQ process identifiers, from the respective HARQ process identifier sets, to process instances associated with respective configured scheduling processes. As a result, the UE may be permitted to determine which HARQ processes are assigned to a particular configured scheduling process in the multi-TRP configuration, which in turn may result in the UE being capable of performing forward error correction for downlink communication and/or uplink communication for the plurality of TRPs in the multi-TRP configuration.

FIGS. 7A-7E are diagrams illustrating an example 700 of HARQ process identifier determination for multiple configured scheduling processes, in accordance with various aspects of the present disclosure. As shown in FIGS. 7A-7E, example 700 may include a plurality of transmit receive points (TRPs) (e.g., TRP1, TRP2, and/or the like,) and a UE (e.g., UE 120). In some aspects, each TRP, of the plurality of TRPs illustrated in FIGS. 7A-7E, may correspond to a respective BS (e.g., BS 110*a*, BS 110*b*, and/or the like). In some aspects, two or more TRPs, of the plurality of TRPs, may be correspond to the same BS. For example, a first TRP may correspond to a first antenna panel or antenna array of a BS and a second TRP may correspond to a second antenna panel or antenna array of the BS.

In some aspects, the plurality of TRPs may configure one or more respective scheduling processes. For example, TRP1 may configure a SPS process for downlink communication between TRP1 and UE 120 and a GFS process for uplink communication between TRP1 and UE 120, TRP2 may configure a SPS process for downlink communication between TRP2 and UE 120 and a GFS process for uplink communication between TRP2 and UE 120, and so on.

In some aspects, the plurality of TRPs may assign HARQ process identifier sets to the configured scheduling processes. For example, TRP1 may assign an HARQ process identifier set to the SPS process associated with TRP1 and an HARQ process identifier set to the GFS process associated with TRP1. As another example, TRP2 may assign an HARQ process identifier set to the SPS process associated with TRP2 and an HARQ process identifier set to the GFS process associated with TRP2.

In some aspects, TRP1 and TRP2 may coordinate the assignment of respective HARQ process identifier sets. For example, TRP1 and TRP2 may coordinate the assignment of respective HARQ process identifier sets such that the respective HARQ process identifier sets are disjoint HARQ process identifier sets (e.g., such that no HARQ process identifier, included in a first HARQ process identifier set associated with a configured scheduling process of TRP1, is included in a second HARQ process identifier set associated with a configured scheduling process of TRP2, and vice-versa). As another example, TRP1 and TRP2 may coordinate the assignment of respective HARQ process identifier sets such that the respective HARQ process identifier sets are the same HARQ process identifier sets (e.g., such that the HARQ process identifiers, included in a first HARQ process identifier set associated with a configured scheduling process of TRP1, are also included in a second HARQ process identifier set associated with a configured scheduling process of TRP2, and vice-versa). As another example, TRP1 and TRP2 may coordinate the assignment of respective HARQ process identifier sets such that the respective HARQ process identifier sets at least partially overlap (e.g., such that a subset of HARQ process identifiers, included in a first HARQ process identifier set associated with a configured scheduling process of TRP1, are also included in a second HARQ process identifier set associated with a configured scheduling process of TRP2).

In some aspects, TRP1 may transmit, to TRP2, information identifying a quantity of HARQ process identifiers that are included in an HARQ process identifier set that is assigned to a configured scheduling process of TRP1, may transmit information identifying the HARQ process identifiers that are included in the HARQ process identifier set, and/or the like. In some aspects, TRP2 may transmit similar information to TRP1.

Figure 7A:
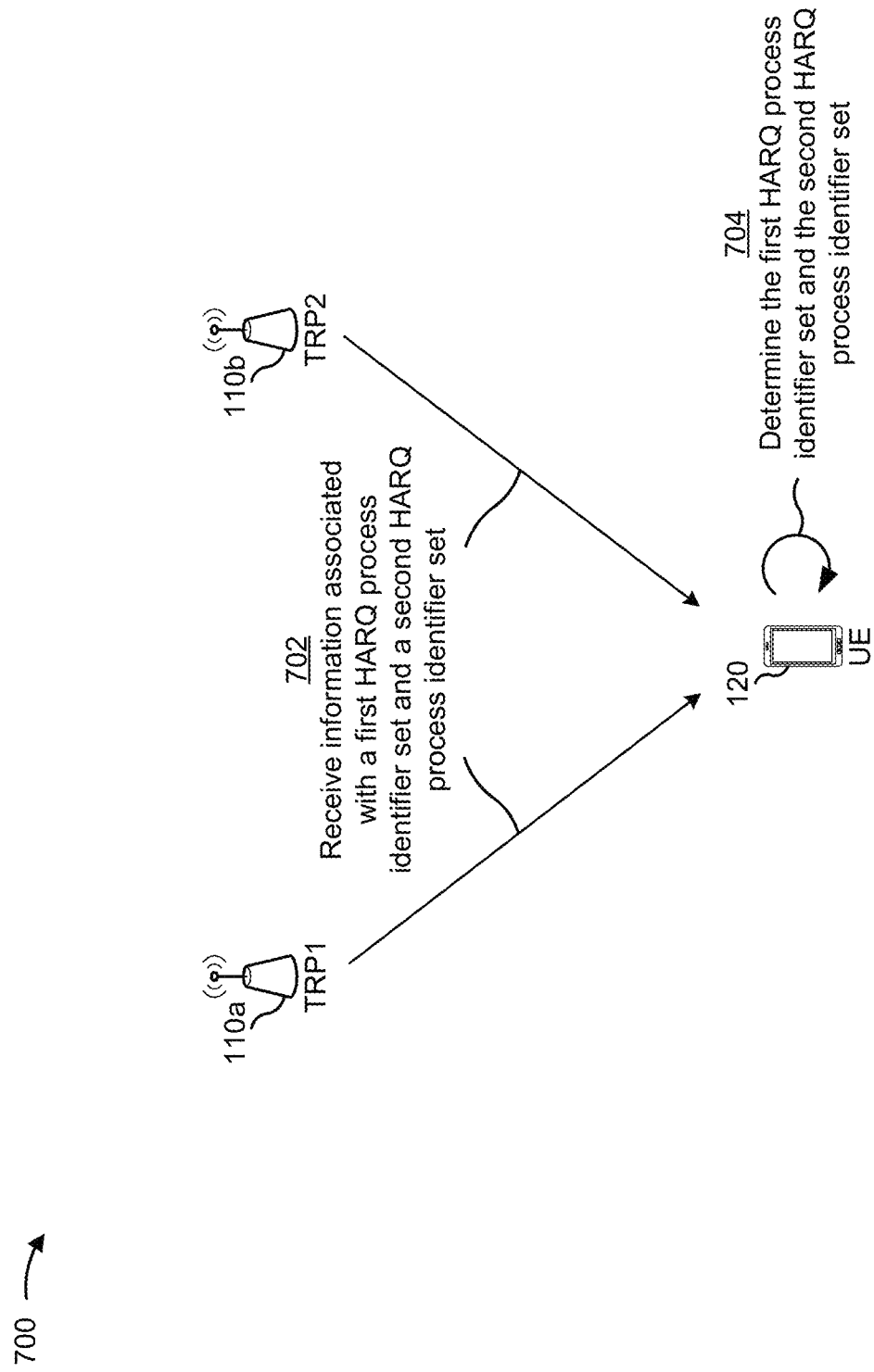
FIGS. 7A-7E are diagrams illustrating an example of HARQ process identifier determination for multiple configured scheduling processes, in accordance with various aspects of the present disclosure.

As shown in FIG. 7A, and by reference number 702, TRP1 and/or TRP2 may transmit, to UE 120, information associated with one or more HARQ process identifier sets that are associated with a configured scheduling process of TRP1, information associated with one or more HARQ process identifier sets that are associated with a configured scheduling process of TRP2, and/or the like. For example, in some aspects, TRP1 may transmit a signaling communication (e.g., a radio resource control (RRC) communication, a downlink control information (DCI) communication, a medium access control control element (MAC-CE) communication, and/or the like) that includes information associated with a first HARQ process identifier set that is associated with a configured scheduling process of TRP1, and information associated with a second HARQ process identifier set that is associated with a configured scheduling process of TRP2. As another example, TRP1 may transmit a signaling communication that includes the information associated with the first HARQ process identifier set, and TRP2 may transmit a signaling communication that includes the information associated with the second HARQ process identifier set.

In some aspects, the information associated with a particular HARQ process identifier set may include information identifying a quantity of HARQ process identifiers included in the HARQ process identifier set, an offset associated with the HARQ process identifier set, and/or the like.

The offset associated with an HARQ process identifier set may be determined based at least in part on a quantity of HARQ process identifiers that is included in another HARQ process identifier set. For example, if an HARQ process identifier set, associated with an SPS process of TRP1, includes four HARQ process identifiers, the offset associated with an HARQ processor identifier set, that is associated with an SPS process of TRP2, may be determined as four.

As further shown in FIG. 7A, and by reference number 704, UE 120 may determine the first HARQ process identifier set (e.g., may determine the HARQ process identifiers that are included in the first HARQ process identifier set) and the second HARQ process identifier set (e.g., may determine the HARQ process identifiers that are included in the second HARQ process identifier set). For example, UE 120 may determine the first HARQ process identifier set based at least in part on the information associated with the first HARQ process identifier set. As another example, UE 120 may determine the second HARQ process identifier set based at least in part on the information associated with the second HARQ process identifier set.

In some aspects, if the information associated with an HARQ process identifier set includes information identifying an offset associated with the HARQ process identifier set and a quantity of HARQ process identifiers included in the HARQ process identifier set, UE 120 may determine the HARQ process identifier set based at least in part on the offset associated with the HARQ process identifier set and the quantity of HARQ process identifiers included in the HARQ process identifier set. For example, UE 120 may determine the HARQ process identifier set based at least in part on adding the value of the offset associated with the HARQ process identifier set to Equation 1 and/or Equation 3 above.

Figure 7B:
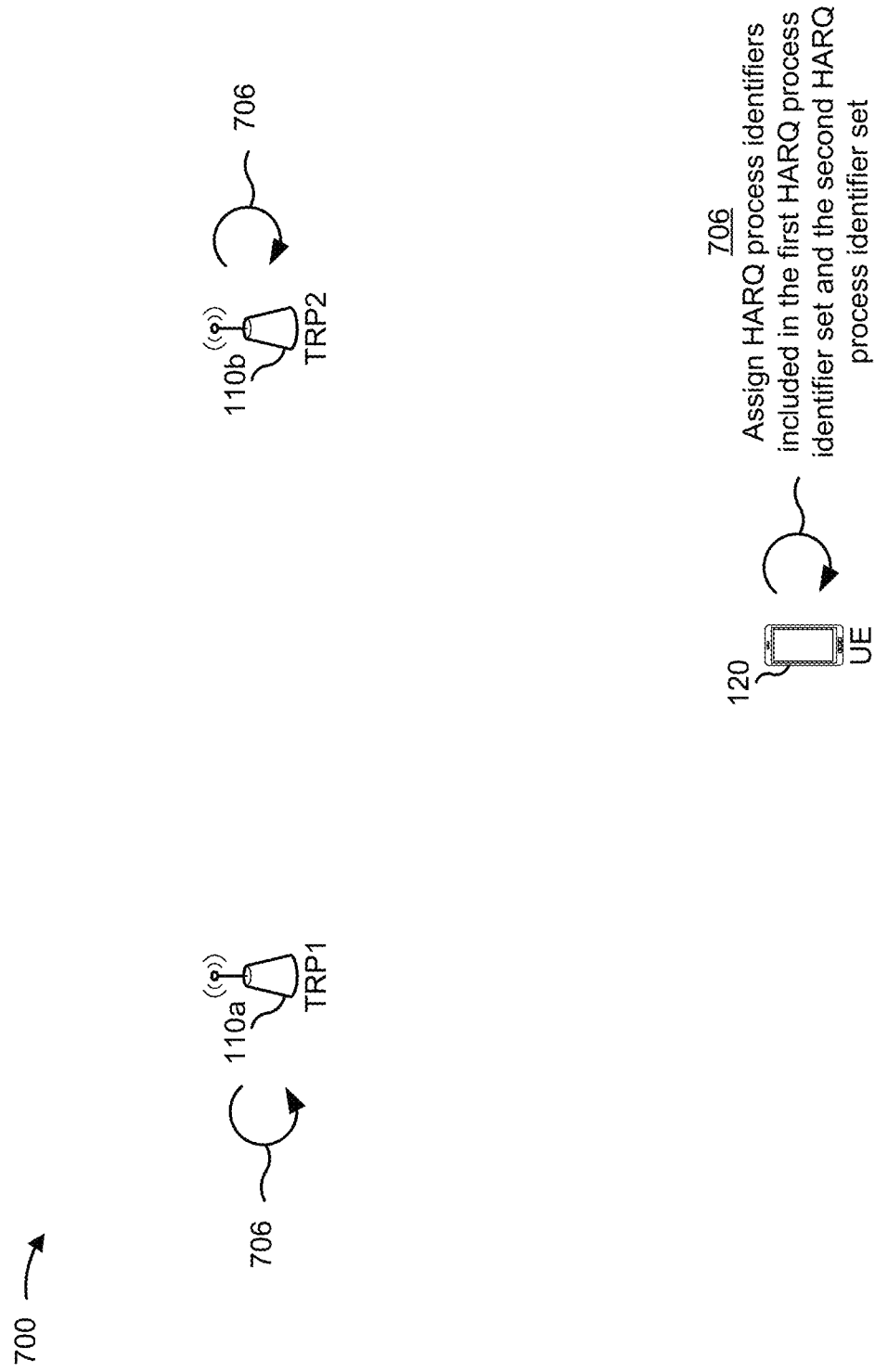

As shown in FIG. 7B, and by reference number 706, TRP1, TRP2, and/or UE 120 may assign HARQ process identifiers, included in the first HARQ process identifier set and/or the second HARQ process identifier set. For example, TRP1 and UE 120 may assign HARQ process identifiers, included in the first HARQ process identifier set, to process instances (e.g., SPS transmissions, GFS transmission, and/or the like) associated with a configured scheduling process of TRP1 (e.g., a SPS process, a GFS process). As another example, TRP2 and UE 120 may assign HARQ process identifiers, included in the second HARQ process identifier set, to process instances (e.g., SPS transmissions, GFS transmission, and/or the like) associated with a configured scheduling process of TRP2 (e.g., a SPS process, a GFS process).

In some aspects, HARQ process identifiers may be assigned to process instances of the configured scheduling process of TRP1 and the configured scheduling process of TRP2 based at least in part on whether the first HARQ process identifier set and the second HARQ process identifier set are disjoint HARQ processing identifier sets, whether the first HARQ process identifier set and the second HARQ process identifier set at least partially overlap, or whether the first HARQ process identifier set and the second HARQ process identifier set fully overlap.

Figure 7C:
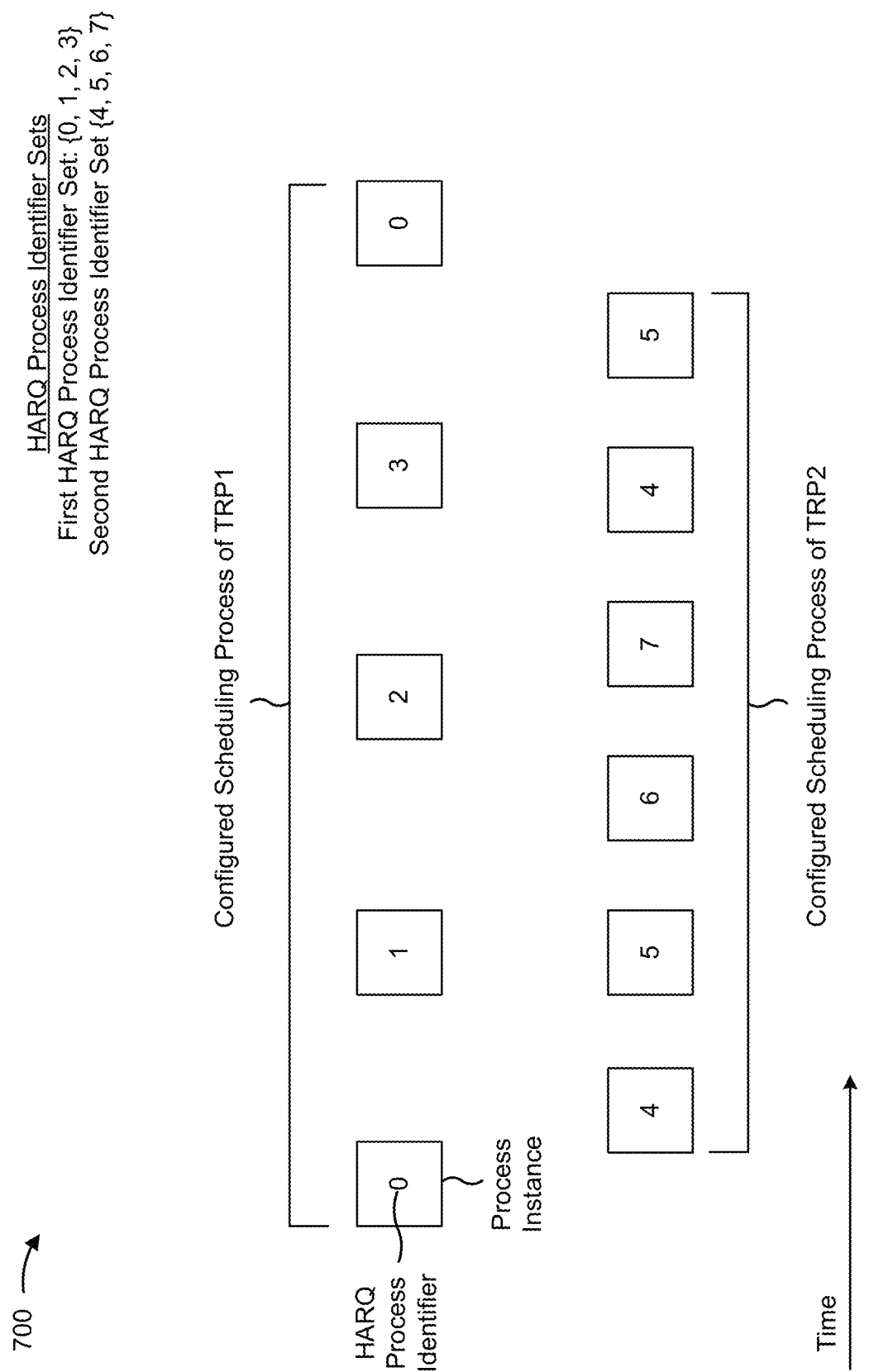

FIG. 7C illustrates an example of assigning HARQ process identifiers from disjoint HARQ process identifier sets. As shown in FIG. 7C, the first HARQ process identifier set may include HARQ process identifiers {0, 1, 2, 3}, and the second HARQ process identifier set may include HARQ process identifiers {4, 5, 6, 7}. As further shown in FIG. 7C, HARQ process identifiers, included in the first HARQ process identifier set, may be sequentially assigned (e.g., by UE 120 and TRP1) to process identifiers of the configured scheduling process of TRP1. For example, HARQ process identifier 0 may be assigned to the first process instance of the configured scheduling process of TRP1, HARQ process identifier 1 may be assigned to the second process instance of the configured scheduling process of TRP1 (e.g., the next processing instance in the time domain), and so on.

Similarly, HARQ process identifiers, included in the second HARQ process identifier set, may be sequentially assigned (e.g., by UE 120 and TRP2) to process identifiers of a configured scheduling process of TRP2. For example, HARQ process identifier 4 may be assigned to the first process instance of the configured scheduling process of TRP2, HARQ process identifier 5 may be assigned to the second process instance of the configured scheduling process of TRP2 (e.g., the next processing instance in the time domain), and so on.

In this way, the HARQ process identifiers, included in each HARQ process identifier set, are spaced out as far as possible in the time domain. This ensures adequate spacing between HARQ process identifiers for retransmissions of a particular process instance. Moreover, in this way, if a process instance associated with the configured scheduling process of TRP1, and a process instance associated with the configured scheduling process of TRP2 overlap in the time domain, the HARQ process identifiers are assigned in a manner that does not result in a particular HARQ process identifier being assigned to overlapping process instances. For example, while the second process instance associated with the configured scheduling process of TRP1, and the second process instance associated with the scheduling process of TRP2, overlap in the time domain, the second process instance associated with the configured scheduling process of TRP1 is assigned HARQ process identifier 1, whereas the second process instance associated with the configured scheduling process of TRP2 is assigned HARQ process identifier 5, and thus no conflict of HARQ process identifiers occurs.

In some aspects, TRP1, TRP2, and/or UE 120 may assign HARQ process identifiers to process instances associated with respective configured scheduling processes based at least in part on calculating an index associated with a particular HARQ process identifier set. For example, TRP1, TRP2, and/or UE 120 may use Equation 1 (e.g., for an SPS configured scheduling process) or Equation 3 (e.g., for a GFS configured scheduling process) to compute an HARQ process identifier index for a particular process instance associated with a configured scheduling process. The HARQ process identifier index may indicate a position, of the HARQ process identifier that is to be assigned to the process instance, in the HARQ process identifier set that is associated with the configured scheduling process.

As an example of the above, TRP2 and/or UE 120 may compute an HARQ process identifier index for the third process instance associated with the configured scheduling process of TRP2 (e.g., using Equation 1 or Equation 3). The HARQ process identifier index, for the third process instance associated with the configured scheduling process of TRP2, may be computed as 3. TRP2 and/or UE 120 may therefore identify the third HARQ process identifier in the second HARQ process identifier set (i.e., HARQ process identifier 6), and may assign the third HARQ process identifier to the third process instance associated with the configured scheduling process of TRP2.

Figure 7D:
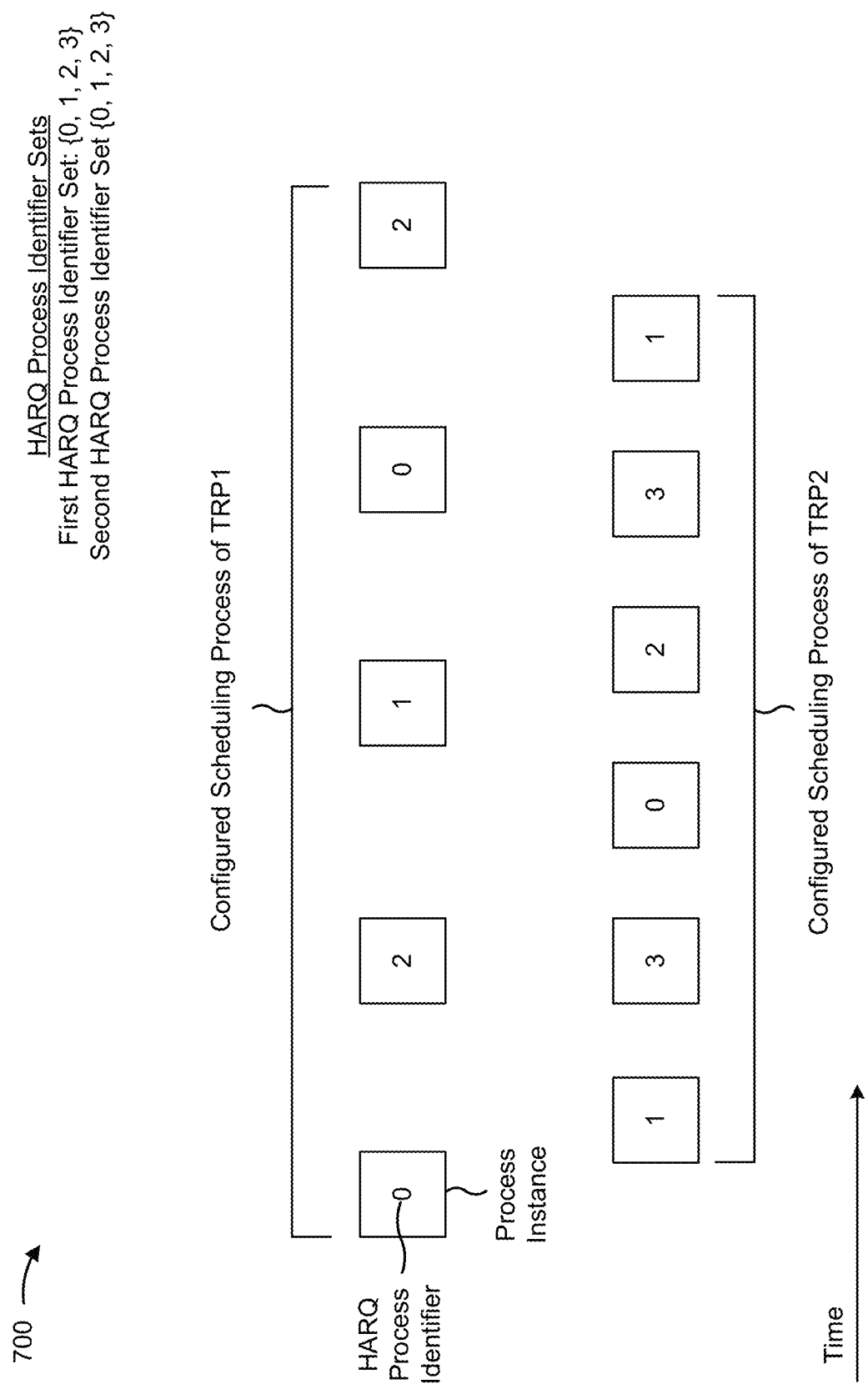

FIG. 7D illustrates an example of assigning HARQ process identifiers from HARQ process identifier sets that fully overlap. As shown in FIG. 7D, the first HARQ process identifier set and the second HARQ process identifier set may be assigned a shared HARQ process identifier set of HARQ process identifiers {0, 1, 2, 3}. In some aspects, UE 120, TRP1, and TRP2 may assign HARQ process identifiers, from the shared process identifier set, to the configured scheduling process of TRP1 and/or to the configured scheduling process of TRP2 based at least in part on various factors. In some aspects, the various factors may include a periodicity of the configured scheduling process of TRP1 (e.g., a frequency at which process instances associated with the configured scheduling process of TRP1 occur in the time domain), a periodicity of the configured scheduling process of TRP2 (e.g., a frequency at which process instances associated with the configured scheduling process of TRP2 occur in the time domain), a priority associated with the configured scheduling process of TRP1, a priority associated with the configured scheduling process of TRP2, and/or the like.

In some aspects, the priority associated with the configured scheduling process of TRP1, and the priority associated with the configured scheduling process of TRP2, may be determined based at least on which TRP is the serving TRP for UE 120. Accordingly, if TRP1 is the serving TRP for UE 120, the configured scheduling process of TRP1 may be assigned a greater priority relative to the configured scheduling process of TRP2.

In some aspects, TRP1, TRP2, and/or UE 120 may sequentially assign HARQ process identifiers, from the shared HARQ process identifier set, to process instances associated with the configured scheduling process of TRP1 and/or process instances associated with the configured scheduling process of TRP2 as the process instances occur in the time domain unless respective process instances associated with the configured scheduling process of TRP1 and the configures scheduling process of TRP2 overlap in the time domain. If respective process instances associated with the configured scheduling process of TRP1 and the configured scheduling process of TRP2 overlap in the time domain, TRP1, TRP2, and/or UE 120 may assign the next HARQ process identifier, in the sequence of HARQ process identifiers included in the shared HARQ process identifier set, based at least in part on the priority of the configured scheduling process of TRP1 and the priority of the configured scheduling process of TRP2.

As an example of the above, since the first process instance associated with the configured scheduling process of TRP1 occurs first in the time domain, and there is no overlap with another process instance, TRP1, TRP2, and/or UE 120 may assign HARQ process identifier 0 to the first process instance associated with the configured scheduling process of TRP1. Since the first process instance associated with the configured scheduling process of TRP2 occurs next in the time domain, and there is no overlap with another process instance, TRP1, TRP2, and/or UE 120 may assign HARQ process identifier 1 to the first process instance associated with the configured scheduling process of TRP2.

Since the second process instance associated the configured scheduling process for TRP1 and the second process instance associated with the configured scheduling process for TRP2 overlap in the time domain, TRP1, TRP2, and/or UE 120 may assign HARQ process identifiers to the second process instance associated the configured scheduling process for TRP1 and the second process instance associated with the configured scheduling process for TRP2 based at least in part on the priority associated with the configured scheduling process of TRP1 and the priority associated with the configured scheduling process of TRP2. In this case, if the priority associated with the configured scheduling process of TRP1 is greater relative to the priority associated with the configured scheduling process of TRP2, TRP1, TRP2, and/or UE 120 may assign the next sequential HARQ process identifier in the shared HARQ process identifier set (e.g., HARQ process identifier 2) to the second process instance associated with the configured scheduling process of TRP1, and may assign the subsequent HARQ process identifier in the shared HARQ process identifier set (e.g., HARQ process identifier 3) to the second process instance associated with the configured scheduling process of TRP2. TRP1, TRP2, and/or UE 120 may proceed to assign HARQ process identifiers from the shared HARQ process identifier set accordingly.

Figure 7E:
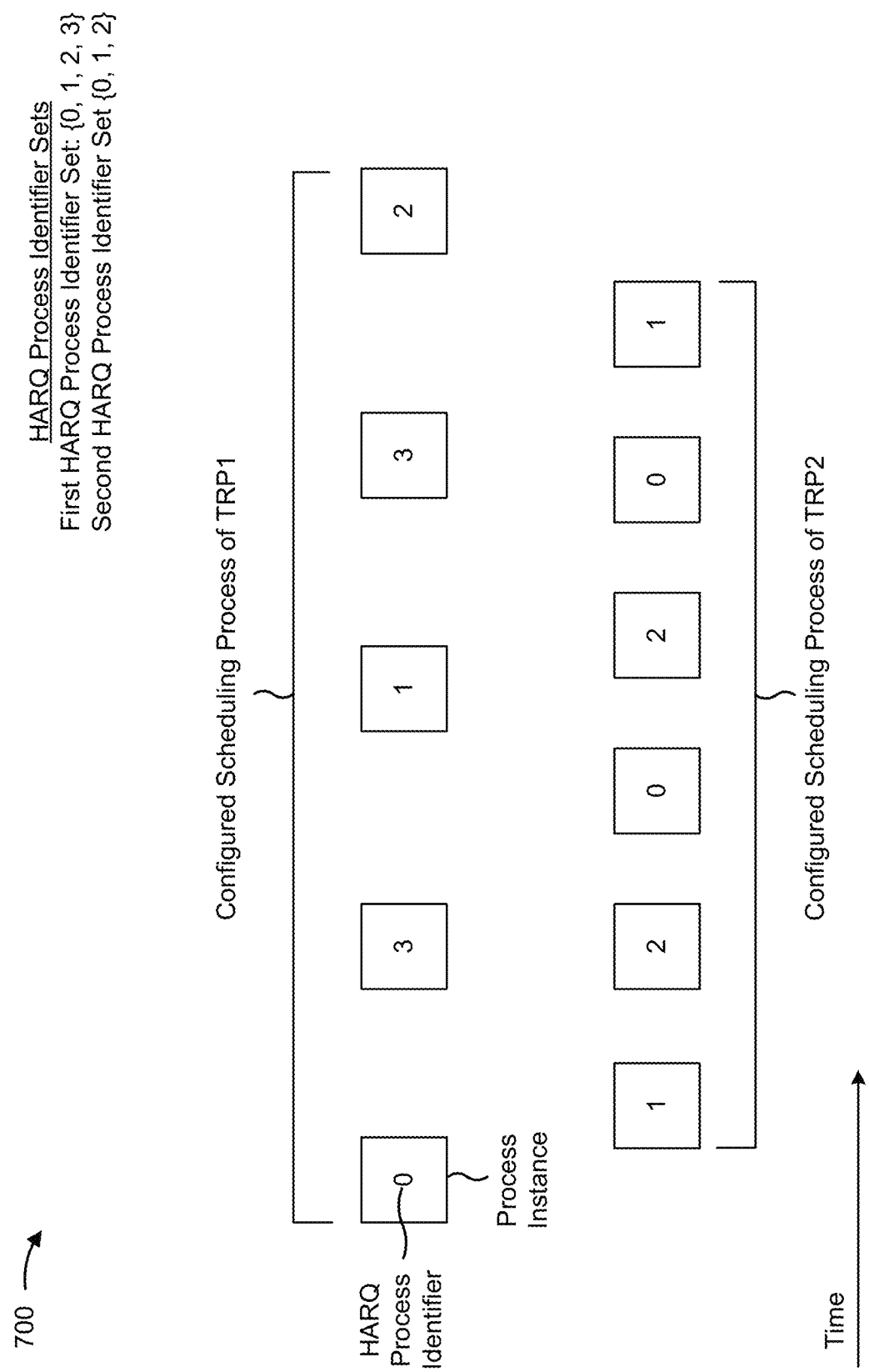

FIG. 7E illustrates an example of assigning HARQ process identifiers from HARQ process identifier sets that at least partially overlap (e.g., where at least one HARQ process identifier, included in an HARQ process identifier set, is not included in the other HARQ process identifier set, and where at least one HARQ process identifier, included in an HARQ process identifier set, is also included in the other HARQ process identifier set). As shown in FIG. 7E, the first HARQ process identifier set may include HARQ process identifiers {0, 1, 2, 3}, and the second HARQ process identifier set may include HARQ process identifiers {0, 1, 2}. In this case, HARQ process identifiers {0, 1, 2} are shared HARQ process identifiers and HARQ process identifier 3 is a unique HARQ process identifier that is only included in the first HARQ process identifier set.

In some aspects, TRP1, TRP2, and/or UE 120 may assign the shared HARQ process identifiers to the process instances included in the configured scheduling process of TRP1, and/or to the process instances included in the configured scheduling process of TRP2, in a manner similar as described above in reference to FIG. 7D. In addition, TRP1, TRP2, and/or UE 120 may assign the unique HARQ process identifiers in a manner that maximizes the spacing between the same HARQ process identifiers in the time domain. To do so, TRP1, TRP2, and/or UE 120 may assign HARQ process identifiers included in the first HARQ process identifier set and/or the second HARQ process identifier set based at least in part on additional factors, such as a quantity of HARQ process identifiers included in the first HARQ process identifier set, a quantity of HARQ process identifiers included in the second HARQ process identifier set, a quantity of shared HARQ process identifiers included in the first HARQ process identifier set and the second HARQ process identifier set, a quantity of unique HARQ process identifiers included in the first HARQ process identifier set, a quantity of unique HARQ process identifiers included in the second HARQ process identifier set, and/or the like.

In this way, UE 120, TRP1, and TRP2 may be permitted to determine respective HARQ process identifier sets for a multi-TRP configuration and/or a multi-panel configuration and/or may be permitted to assign HARQ process identifiers, from the respective HARQ process identifier sets, to process instances associated with respective configured scheduling processes. As a result, UE 120 may be permitted to determine which HARQ processes are assigned to a particular configured scheduling process in the multi-TRP configuration, which in turn may result in UE 120 being capable of performing forward error correction for downlink communication and/or uplink communication for TRP1 and TRP2 in the multi-TRP configuration.

As indicated above, FIGS. 7A-7E are provided as an example. Other examples may differ from what is described with respect to FIGS. 7A-7E.

Figure 8:
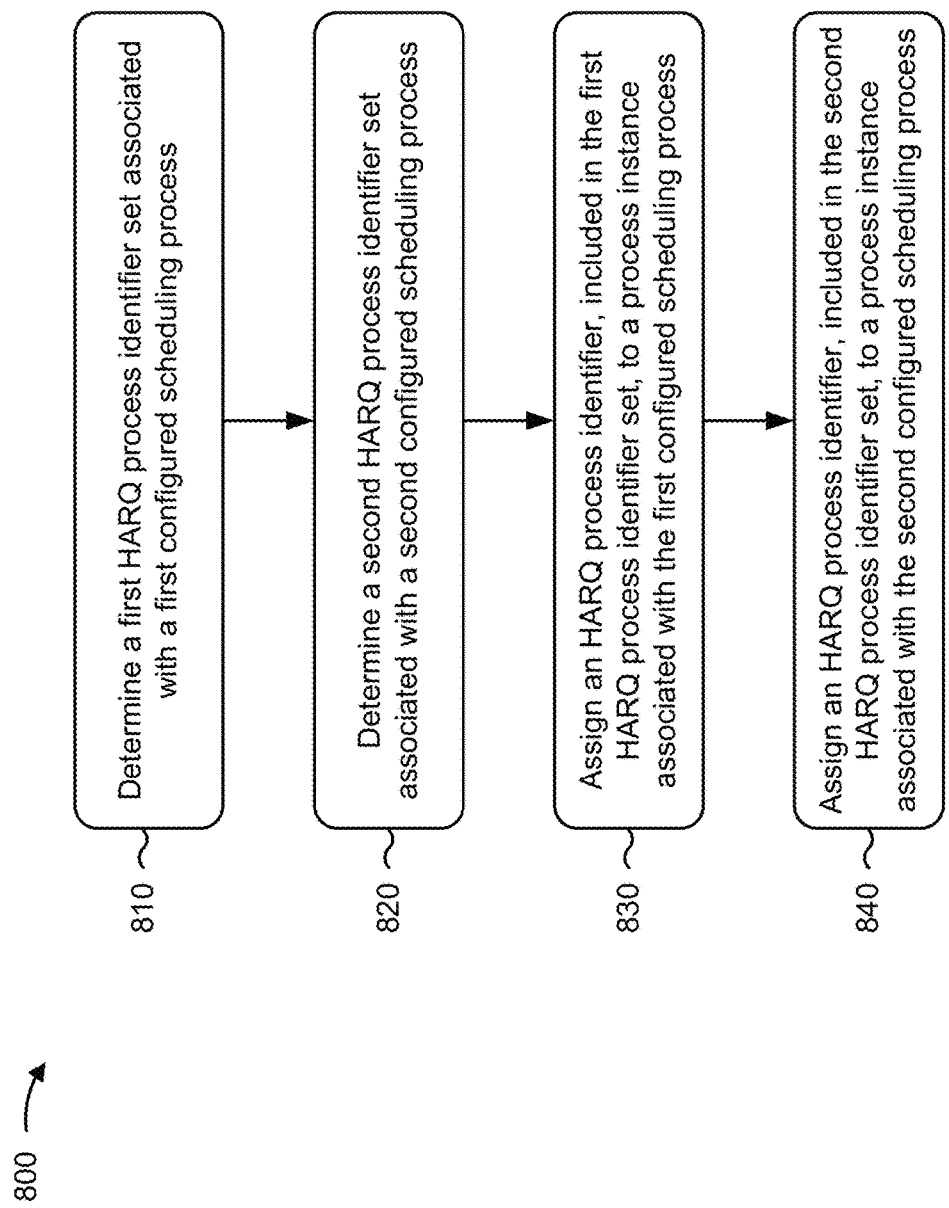
FIG. 8 is a diagram illustrating an example process performed, for example, by a UE, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120) performs HARQ process identifier determination for multiple configured scheduling processes.

As shown in FIG. 8, in some aspects, process 800 may include determining a first HARQ process identifier set associated with a first configured scheduling process (block 810). For example, the UE (e.g., using controller/processor 280, memory 282, and/or the like) may determine a first HARQ process identifier set associated with a first configured scheduling process, as described above.

As further shown in FIG. 8, in some aspects, process 800 may include determining a second HARQ process identifier set associated with a second configured scheduling process (block 820). For example, the UE (e.g., using controller/processor 280, memory 282, and/or the like) may determine a second HARQ process identifier set associated with a second configured scheduling process, as described above.

As further shown in FIG. 8, in some aspects, process 800 may include assigning an HARQ process identifier, included in the first HARQ process identifier set, to a process instance associated with the first configured scheduling process (block 830). For example, the UE (e.g., using controller/processor 280, memory 282, and/or the like) may assign an HARQ process identifier, included in the first HARQ process identifier set, to a process instance associated with the first configured scheduling process, as described above.

As further shown in FIG. 8, in some aspects, process 800 may include assigning an HARQ process identifier, included in the second HARQ process identifier set, to a process instance associated with the second configured scheduling process (block 840). For example, the UE (e.g., using controller/processor 280, memory 282, and/or the like) may assign an HARQ process identifier, included in the second HARQ process identifier set, to a process instance associated with the second configured scheduling process, as described above.

Process 800 may include additional aspects, such as any single aspect or any combination of aspects described below and/or in connection with one or more other processes described elsewhere herein.

In a first aspect, the first configured scheduling process is associated with a first TRP included in a multi-TRP configuration and the second configured scheduling process is associated with a second TRP included in the multi-TRP configuration. In a second aspect, alone or in combination with the first aspect, the first configured scheduling process is associated with a first antenna panel included in a multi-panel configuration and the second configured scheduling process is associated with a second antenna panel included in the multi-panel configuration.

In a third aspect, alone or in combination with one or more of the first or second aspects, process 800 comprises assigning another HARQ process identifier, included in the first HARQ process identifier set, to another process instance associated with the first configured scheduling process, wherein the other HARQ process identifier, included in the first HARQ process identifier set, is sequentially incremented respective to the HARQ process identifier, included in the first HARQ process identifier set, assigned to the process instance associated with the first configured scheduling process, and assigning another HARQ process identifier, included in the second HARQ process identifier set, to another process instance associated with the second configured scheduling process, wherein the other HARQ process identifier, included in the second HARQ process identifier set, is sequentially incrementing respective to the HARQ process identifier, included in the first HARQ process identifier set, assigned to the process instance associated with the first configured scheduling process.

In a fourth aspect, alone or in combination with one or more of the first through third aspects, the first HARQ process identifier set and the second HARQ process identifier set are disjoint HARQ process identifier sets. In a fifth aspect, alone or in combination with one or more of the first through fourth aspects, assigning the HARQ process identifier, included in the first HARQ process identifier set, to the process instance associated with the first configured scheduling process comprises computing a HARQ process identifier index and assigning, based at least in part on determining that the HARQ process identifier index is associated with the with the HARQ process identifier included in the first HARQ process identifier set, the HARQ process identifier, included in the first HARQ process identifier set, to the process instance associated with the first configured scheduling process. In a sixth aspect, alone or in combination with one or more of the first through fifth aspects, assigning the HARQ process identifier, included in the second HARQ process identifier set, to the process instance associated with the second configured scheduling process comprises computing another HARQ process identifier index and assigning, based at least in part on determining that the other HARQ process identifier index is associated with the with the HARQ process identifier included in the second HARQ process identifier set, the HARQ process identifier, included in the second HARQ process identifier set, to the process instance associated with the second configured scheduling process.

In a seventh aspect, alone or in combination with one or more of the first through sixth aspects, process 800 comprises receiving information identifying a first offset associated with the first HARQ process identifier set and a second offset associated with the first HARQ process identifier set. In an eighth aspect, alone or in combination with one or more of the first through seventh aspects, determining the first HARQ process identifier set comprises determining the first HARQ process identifier set based at least in part on the first offset, and determining the second HARQ process identifier set comprises determining the second HARQ process identifier set based at least in part on the second offset. In a ninth aspect, alone or in combination with one or more of the first through eighth aspects, the second offset is based at least in part on a quantity of HARQ process identifiers included in the first HARQ process identifier set. In a tenth aspect, alone or in combination with one or more of the first through ninth aspects, the first HARQ process identifier set and the second HARQ process identifier set are a shared HARQ process identifier set.

In an eleventh aspect, alone or in combination with one or more of the first through tenth aspects, assigning the HARQ process identifier, included in the first HARQ process identifier set, to the process instance associated with the first configured scheduling process comprises assigning a first shared HARQ process identifier, included in the shared HARQ process identifier set, to the process instance associated with the first configured scheduling process. In a twelfth aspect, alone or in combination with one or more of the first through eleventh aspects, assigning the HARQ process identifier, included in the second HARQ process identifier set, to the process instance associated with the second configured scheduling process comprises assigning a second shared HARQ process identifier, included in the shared HARQ process identifier set, to the process instance associated with the second configured scheduling process, wherein the second shared HARQ process identifier is sequentially incremented, within the shared HARQ process identifier set, relative to the first shared HARQ process identifier.

In a thirteenth aspect, alone or in combination with one or more of the first through twelfth aspects, the process instance associated with the first configured scheduling process and the process instance associated with the second configured scheduling process at least partially overlap in time. In a fourteenth aspect, alone or in combination with one or more of the first through thirteenth aspects, assigning the first shared HARQ process identifier, included in the shared HARQ process identifier set, to the process instance associated with the first configured scheduling process comprises assigning, based at least in part on a priority associated with the first configured scheduling process and a priority associated with a second configured scheduling process, the first shared HARQ process identifier, included in the shared HARQ process identifier set, to the process instance associated with the first configured scheduling process.

In a fifteenth aspect, alone or in combination with one or more of the first through fourteenth aspects, the first HARQ process identifier set and the second HARQ process identifier set include one or more shared HARQ process identifiers. In some aspects, assigning the HARQ process identifier, included in the first HARQ process identifier set, to the process instance associated with the first configured scheduling process comprises assigning a first shared HARQ process identifier, of the one or more shared HARQ process identifiers, to the process instance associated with the first configured scheduling process. In a sixteenth aspect, alone or in combination with one or more of the first through fifteenth aspects, assigning the HARQ process identifier, included in the second HARQ process identifier set, to the process instance associated with the second configured scheduling process comprises assigning a second shared HARQ process identifier, of the one or more shared HARQ process identifiers, to the process instance associated with the second configured scheduling process, wherein the second shared HARQ process identifier is sequentially incremented, within the shared HARQ process identifier set, relative to the first shared HARQ process identifier.

In a seventeenth aspect, alone or in combination with one or more of the first through sixteenth aspects, the process instance associated with the first configured scheduling process and the process instance associated with the second configured scheduling process at least partially overlap in time. In an eighteenth aspect, alone or in combination with one or more of the first through seventeenth aspects, assigning the HARQ process identifier, included in the first HARQ process identifier set, to the process instance associated with the first configured scheduling process comprises assigning the HARQ process identifier, included in the first HARQ process identifier set, to the process instance associated with the first configured scheduling process, wherein the HARQ process identifier, included in the first HARQ process identifier set, is not included in the second HARQ process identifier set. In a nineteenth aspect, alone or in combination with one or more of the first through eighteenth aspects, assigning the HARQ process identifier, included in the second HARQ process identifier set, to the process instance associated with the second configured scheduling process comprises assigning a shared HARQ process identifier, of the one or more shared HARQ process identifiers, to the process instance associated with the second configured scheduling process.

In a twentieth aspect, alone or in combination with one or more of the first through nineteenth aspects, process 800 comprises periodically assigning, to one or more subsequent process instances associated with the first configured scheduling process, the HARQ process identifier included in the first HARQ process identifier set, wherein the HARQ process identifier included, in the first HARQ process identifier set, is not included in the second HARQ process identifier set.

In a twenty-first aspect, alone or in combination with one or more of the first through nineteenth aspects, periodically assigning, to the one or more subsequent process instances associated with the first configured scheduling process, the HARQ process identifier included in the first HARQ process identifier set comprises periodically assigning the HARQ process identifier, included in the first HARQ process identifier set, based at least in part on at least one of a periodicity of the first configured scheduling process, a periodicity of the second configured scheduling process, a quantity of HARQ process identifiers included in the one or more shared HARQ process identifiers, or a quantity of HARQ process identifiers, included in the first HARQ process identifier set, that is not included in the second HARQ process identifier set.

In a twenty-second aspect, alone or in combination with one or more of the first through twenty-first aspects, the first configured scheduling process and the second configured scheduling process comprise respective downlink semi-persistent scheduling processes or respective uplink configured grant scheduling processes.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may, depending on context, refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining, based at least in part on a first offset, a first hybrid automatic repeat request (HARQ) process identifier set associated with a first configured scheduling process associated with a first transmit receive point (TRP) included in a multi-TRP configuration;
   determining, based at least in part on a second offset, a second HARQ process identifier set associated with a second configured scheduling process associated with a second TRP included in the multi-TRP configuration, wherein the second HARQ process identifier set at least partially overlaps with the first HARQ process identifier set;
   assigning an HARQ process identifier, included in the first HARQ process identifier set, to a process instance associated with the first configured scheduling process;
   assigning an HARQ process identifier, included in the second HARQ process identifier set, to a process instance associated with the second configured scheduling process;
   assigning another HARQ process identifier, included in the first HARQ process identifier set, to another process instance associated with the first configured scheduling process,
      wherein the other HARQ process identifier, included in the first HARQ process identifier set, is sequentially incremented respective to the HARQ process identifier, included in the first HARQ process identifier set, assigned to the process instance associated with the first configured scheduling process; and
   assigning another HARQ process identifier, included in the second HARQ process identifier set, to another process instance associated with the second configured scheduling process,
      wherein the other HARQ process identifier, included in the second HARQ process identifier set, is sequentially incremented respective to the other HARQ process identifier, included in the first HARQ process identifier set, assigned to the process instance associated with the first configured scheduling process.

2. The method of claim 1,
wherein the first configured scheduling process is associated with a first antenna panel included in a multi-panel configuration and the second configured scheduling process is associated with a second antenna panel included in the multi-panel configuration.

3. The method of claim 1,
wherein the other HARQ process identifier, included in the second HARQ process identifier set, is incremented respective to the HARQ process identifier, included in the first HARQ process identifier set, based at least in part a priority associated with the other process instance associated with the second configured scheduling process being a lower priority relative to a priority associated with the other process instance associated with the first configured scheduling process.

4. The method of claim 3, wherein the other process instance associated with the first HARQ process identifier set and the other process instance associated with the second HARQ process identifier set at least partially overlap in a time domain.

5. The method of claim 1, wherein assigning the HARQ process identifier, included in the first HARQ process identifier set, to the process instance associated with the first configured scheduling process comprises:
computing a HARQ process identifier index; and
assigning, based at least in part on determining that the HARQ process identifier index is associated with the HARQ process identifier included in the first HARQ process identifier set, the HARQ process identifier, included in the first HARQ process identifier set, to the process instance associated with the first configured scheduling process.

6. The method of claim 5, wherein assigning the HARQ process identifier, included in the second HARQ process identifier set, to the process instance associated with the second configured scheduling process comprises:
computing another HARQ process identifier index; and
assigning, based at least in part on determining that the other HARQ process identifier index is associated with the HARQ process identifier included in the second HARQ process identifier set, the HARQ process identifier, included in the second HARQ process identifier set, to the process instance associated with the second configured scheduling process.

7. The method of claim 1, further comprising:
receiving information that identifies that the first offset is associated with the first HARQ process identifier set and that the second offset is associated with the second HARQ process identifier set.

8. The method of claim 1, wherein the second offset is based at least in part on a quantity of HARQ process identifiers included in the first HARQ process identifier set.

9. The method of claim 1, wherein the first HARQ process identifier set and the second HARQ process identifier set are a shared HARQ process identifier set.

10. The method of claim 9, wherein assigning the HARQ process identifier, included in the first HARQ process identifier set, to the process instance associated with the first configured scheduling process comprises:
assigning a first shared HARQ process identifier, included in the shared HARQ process identifier set, to the process instance associated with the first configured scheduling process; and
wherein assigning the HARQ process identifier, included in the second HARQ process identifier set, to the process instance associated with the second configured scheduling process comprises:
assigning a second shared HARQ process identifier, included in the shared HARQ process identifier set, to the process instance associated with the second configured scheduling process,
wherein the second shared HARQ process identifier is sequentially incremented, within the shared HARQ process identifier set, relative to the first shared HARQ process identifier.

11. The method of claim 10, wherein the process instance associated with the first configured scheduling process and the process instance associated with the second configured scheduling process at least partially overlap in time; and
wherein assigning the first shared HARQ process identifier, included in the shared HARQ process identifier set, to the process instance associated with the first configured scheduling process comprises:
assigning, based at least in part on a priority associated with the first configured scheduling process and a priority associated with a second configured scheduling process, the first shared HARQ process identifier, included in the shared HARQ process identifier set, to the process instance associated with the first configured scheduling process.

12. The method of claim 1, wherein the first HARQ process identifier set and the second HARQ process identifier set include corresponding shared HARQ process identifiers.

13. The method of claim 12, wherein assigning the HARQ process identifier, included in the first HARQ process identifier set, to the process instance associated with the first configured scheduling process comprises:
assigning a first shared HARQ process identifier, of the one or more shared HARQ process identifiers, to the process instance associated with the first configured scheduling process; and
wherein assigning the HARQ process identifier, included in the second HARQ process identifier set, to the process instance associated with the second configured scheduling process comprises:
assigning a second shared HARQ process identifier, of the one or more shared HARQ process identifiers, to the process instance associated with the second configured scheduling process,
wherein the second shared HARQ process identifier is sequentially incremented, within the shared HARQ process identifier set, relative to the first shared HARQ process identifier.

14. The method of claim 12, wherein the process instance associated with the first configured scheduling process and the process instance associated with the second configured scheduling process at least partially overlap in time;
wherein assigning the HARQ process identifier, included in the first HARQ process identifier set, to the process instance associated with the first configured scheduling process comprises:
assigning the HARQ process identifier, included in the first HARQ process identifier set, to the process instance associated with the first configured scheduling process,
wherein the HARQ process identifier, included in the first HARQ process identifier set, is not included in the second HARQ process identifier set; and wherein assigning the HARQ process identifier, included in the second HARQ process identifier set, to the process instance associated with the second configured scheduling process comprises:
assigning a shared HARQ process identifier, of the one or more shared HARQ process identifiers, to the process instance associated with the second configured scheduling process.

15. The method of claim 12, further comprising:
periodically assigning, to one or more subsequent process instances associated with the first configured scheduling process, the HARQ process identifier included in the first HARQ process identifier set,
wherein the HARQ process identifier included, in the first HARQ process identifier set, is not included in the second HARQ process identifier set.

16. The method of claim 15, wherein periodically assigning, to the one or more subsequent process instances associated with the first configured scheduling process, the HARQ process identifier included in the first HARQ process identifier set comprises:
periodically assigning the HARQ process identifier, included in the first HARQ process identifier set, based at least in part on at least one of:
a periodicity of the first configured scheduling process,
a periodicity of the second configured scheduling process,
a quantity of HARQ process identifiers included in the one or more shared HARQ process identifiers, or
a quantity of HARQ process identifiers, included in the first HARQ process identifier set, that is not included in the second HARQ process identifier set.

17. The method of claim 1, wherein the first configured scheduling process and the second configured scheduling process comprise:
respective downlink semi-persistent scheduling processes, or
respective uplink configured grant scheduling processes.

18. A user equipment (UE) for wireless communication, comprising:
a memory; and
one or more processors coupled to the memory, the one or more processors configured to:
determine, based at least in part on a first offset, a first hybrid automatic repeat request (HARQ) process identifier set associated with a first configured scheduling process associated with a first transmit receive point (TRP) included in a multi-TRP configuration;
determine, based at least in part on a second offset, a second HARQ process identifier set associated with a second configured scheduling process associated with a second TRP included in the multi-TRP configuration,
wherein the second HARQ process identifier at least partially overlaps with the first HARQ process identifier set;
assign an HARQ process identifier, included in the first HARQ process identifier set, to a process instance associated with the first configured scheduling process,
wherein the HARQ process identifier, included in the first HARQ process identifier set, is sequentially incremented respective to the HARQ process identifier, included in the first HARQ process identifier set, assigned to the process instance associated with the first configured scheduling process; and
assign an HARQ process identifier, included in the second HARQ process identifier set, to a process instance associated with the second configured scheduling process,
wherein the HARQ process identifier, included in the second HARQ process identifier set, is sequentially incremented respective to the other HARQ process identifier, included in the first HARQ process identifier set, assigned to the process instance associated with the first configured scheduling process.

19. The UE of claim 18, wherein the one or more processors are further configured to:
receive information that identifies that the first offset is associated with the first HARQ process identifier set and that the second offset is associated with the second HARQ process identifier set.

20. The UE of claim 18, wherein the second offset is based at least in part on a quantity of HARQ process identifiers included in the first HARQ process identifier set.

21. The UE of claim 18, wherein the first configured scheduling process and the second configured scheduling process comprise:
respective downlink semi-persistent scheduling processes, or
respective uplink configured grant scheduling processes.

22. The UE of claim 18, wherein the first HARQ process identifier set and the second HARQ process identifier set fully overlap.

23. A non-transitory computer-readable medium storing one or more instructions for wireless communication, the one or more instructions comprising:
one or more instructions that, when executed by one or more processors of a user equipment (UE), cause the one or more processors to:
determine, based at least in part on a first offset, a first hybrid automatic repeat request (HARQ) process identifier set associated with a first configured scheduling process associated with a first transmit receive point (TRP) included in a multi-TRP configuration;
determine, based at least in part on a second offset, a second HARQ process identifier set associated with a second configured scheduling process associated with a second TRP included in the multi-TRP configuration,
wherein the second HARQ process identifier set at least partially overlaps with the first HARQ process identifier set;
assign an HARQ process identifier, included in the first HARQ process identifier set, to a process instance associated with the first configured scheduling process,
wherein the HARQ process identifier, included in the first HARQ process identifier set, is sequentially incremented respective to the HARQ process identifier, included in the first HARQ process identifier set, assigned to the process instance associated with the first configured scheduling process; and
assign an HARQ process identifier, included in the second HARQ process identifier set, to a process instance associated with the second configured scheduling process,
wherein the HARQ process identifier, included in the second HARQ process identifier set, is sequentially incremented respective to the other HARQ process identifier, included in the first HARQ process identifier set, assigned to the process instance associated with the first configured scheduling process.

24. The non-transitory computer-readable medium of claim 23, wherein the one or more instructions, when executed by the one or more processors, further cause the one or more processors to:
receive information that identifies that the first offset is associated with the first HARQ process identifier set and that the second offset is associated with the second HARQ process identifier set.

25. The non-transitory computer-readable medium of claim 23, wherein the second offset is based at least in part on a quantity of HARQ process identifiers included in the first HARQ process identifier set.

26. The non-transitory computer-readable medium of claim 23, wherein the first configured scheduling process and the second configured scheduling process comprise:
respective downlink semi-persistent scheduling processes, or
respective uplink configured grant scheduling processes.

27. An apparatus for wireless communication, comprising:
means for determining, based at least in part on a first offset, a first hybrid automatic repeat request (HARQ) process identifier set associated with a first configured scheduling process associated with a first transmit receive point (TRP) included in a multi-TRP configuration;
means for determining, based at least in part on a second offset, a second HARQ process identifier set associated with a second configured scheduling process associated with a second TRP included in the multi-TRP configuration,
wherein the second HARQ process identifier set at least partially overlaps with the first HARQ process identifier set;
means for assigning an HARQ process identifier, included in the first HARQ process identifier set, to a process instance associated with the first configured scheduling process,
wherein the HARQ process identifier, included in the first HARQ process identifier set, is sequentially incremented respective to the HARQ process identifier, included in the first HARQ process identifier set, assigned to the process instance associated with the first configured scheduling process; and
means for assigning an HARQ process identifier, included in the second HARQ process identifier set, to a process instance associated with the second configured scheduling process,
wherein the HARQ process identifier, included in the second HARQ process identifier set, is sequentially incremented respective to the other HARQ process identifier, included in the first HARQ process identifier set, assigned to the process instance associated with the first configured scheduling process.

28. The apparatus of claim 27, further comprising:
means for receiving information that identifies that the first offset associated with the first HARQ process identifier set and that the second offset associated with the second HARQ process identifier set.

29. The apparatus of claim 27, wherein the second offset is based at least in part on a quantity of HARQ process identifiers included in the first HARQ process identifier set.

30. The apparatus of claim 27, wherein the first configured scheduling process and the second configured scheduling process comprise:
respective downlink semi-persistent scheduling processes, or
respective uplink configured grant scheduling processes.

* * * * *